United States Patent
Bremser et al.

(10) Patent No.: US 9,944,823 B2
(45) Date of Patent: Apr. 17, 2018

(54) ELECTRICAL INSULATION ENAMELS COMPOSED OF MODIFIED POLYMERS AND ELECTRICAL CONDUCTORS PRODUCED THEREFROM AND HAVING IMPROVED SLIDING CAPACITY

(75) Inventors: Wolfgang Bremser, Dahl (DE); Jorg Ressel, Paderborn (DE); Johann Reicher, Bad Munder (DE)

(73) Assignee: SCHWERING & HASSE ELEKTRODRAHT GMBH, Lugde (DE)

( * ) Notice: Subject to any disclaimer, the term of this patent is extended or adjusted under 35 U.S.C. 154(b) by 1015 days.

(21) Appl. No.: 13/816,027

(22) PCT Filed: Aug. 10, 2011

(86) PCT No.: PCT/EP2011/063796
§ 371 (c)(1),
(2), (4) Date: Feb. 8, 2013

(87) PCT Pub. No.: WO2012/020067
PCT Pub. Date: Feb. 16, 2012

(65) Prior Publication Data
US 2013/0153261 A1    Jun. 20, 2013

(30) Foreign Application Priority Data

Aug. 10, 2010  (DE) .................. 10 2010 039 168

(51) Int. Cl.
*B66B 7/06*  (2006.01)
*B32B 27/08*  (2006.01)
(Continued)

(52) U.S. Cl.
CPC ....... *C09D 177/00* (2013.01); *C08G 18/0823* (2013.01); *C08G 18/12* (2013.01);
(Continued)

(58) Field of Classification Search
CPC ... H01B 3/30; H01B 3/44; H01B 3/46; H01B 9/00; B32B 9/04
See application file for complete search history.

(56) References Cited

U.S. PATENT DOCUMENTS 3,423,479 A    1/1969   Hendricks
3,583,885 A    6/1971   Preston
(Continued)

FOREIGN PATENT DOCUMENTS

AU    2985071        12/1972
BE    771740 A7      12/1971
(Continued)

OTHER PUBLICATIONS

Machine Translation JP-09048920 A.*
(Continued)

*Primary Examiner* — Jennifer Chriss
*Assistant Examiner* — Ricardo Lopez
(74) *Attorney, Agent, or Firm* — Kilpatrick, Townsend & Stockton LLP

(57) ABSTRACT

The present invention relates to electrical insulation enamels which contain a polymer comprising a base polymer and modifying units which are incompatible with the base polymer after the polymer has cured and lead to the formation of separate phases at the surface, and to processes for the production thereof. The electrical insulation enamels have a low coefficient of friction and frictional resistance and are preferably suitable for the coating of wires.

25 Claims, 7 Drawing Sheets

Figure 1A:
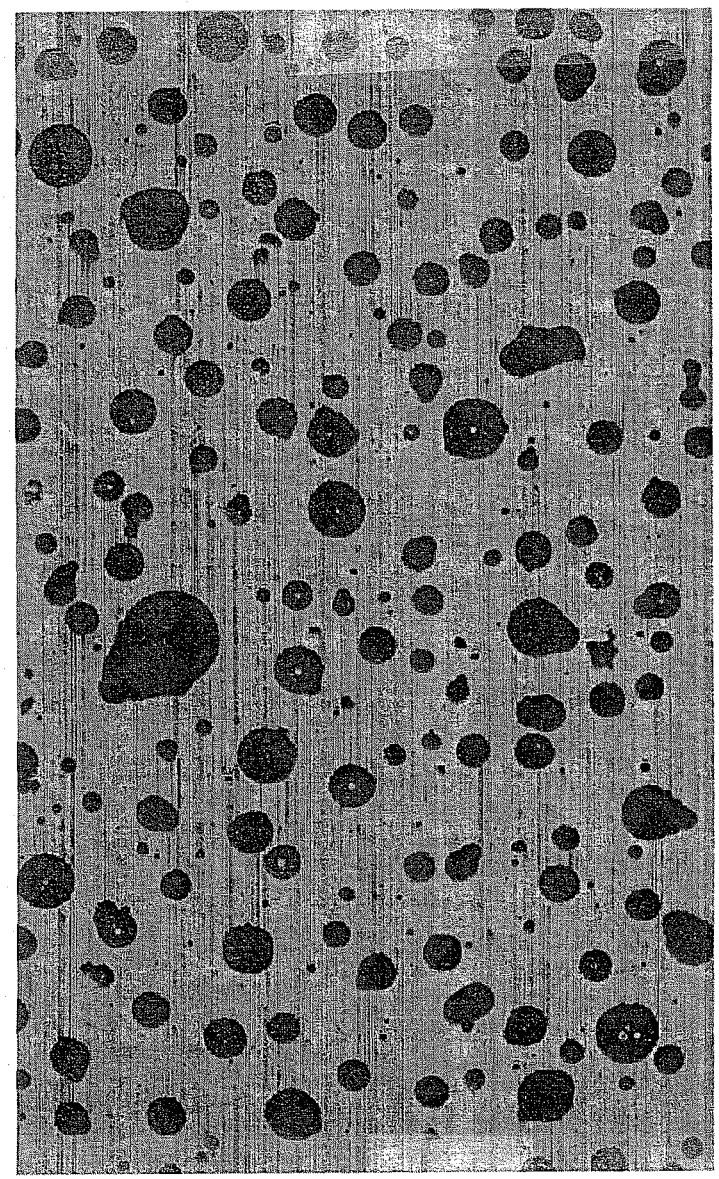

(51) Int. Cl.

| | | |
|---|---|---|
| C09D 177/00 | (2006.01) | |
| C08G 18/08 | (2006.01) | |
| C08G 18/12 | (2006.01) | |
| C08G 18/32 | (2006.01) | |
| C08G 18/34 | (2006.01) | |
| C08G 18/42 | (2006.01) | |
| C08G 18/61 | (2006.01) | |
| C08G 69/48 | (2006.01) | |
| C08G 77/12 | (2006.01) | |
| C08G 77/20 | (2006.01) | |
| C08G 77/42 | (2006.01) | |
| C08G 77/445 | (2006.01) | |
| C08G 77/455 | (2006.01) | |
| C08G 77/458 | (2006.01) | |
| C09D 163/00 | (2006.01) | |
| C09D 175/04 | (2006.01) | |
| C09D 175/06 | (2006.01) | |
| C09D 175/12 | (2006.01) | |
| C09D 179/08 | (2006.01) | |
| C09D 183/10 | (2006.01) | |
| H01B 3/30 | (2006.01) | |
| H01B 3/46 | (2006.01) | |
| C08K 7/00 | (2006.01) | |
| C08L 83/04 | (2006.01) | |
| H01F 5/06 | (2006.01) | |

(52) U.S. Cl.
CPC ..... *C08G 18/3206* (2013.01); *C08G 18/3212* (2013.01); *C08G 18/348* (2013.01); *C08G 18/4233* (2013.01); *C08G 18/61* (2013.01); *C08G 69/48* (2013.01); *C08G 77/12* (2013.01); *C08G 77/20* (2013.01); *C08G 77/42* (2013.01); *C08G 77/445* (2013.01); *C08G 77/455* (2013.01); *C08G 77/458* (2013.01); *C09D 163/00* (2013.01); *C09D 175/04* (2013.01); *C09D 175/06* (2013.01); *C09D 175/12* (2013.01); *C09D 179/08* (2013.01); *C09D 183/10* (2013.01); *H01B 3/303* (2013.01); *H01B 3/305* (2013.01); *H01B 3/306* (2013.01); *H01B 3/46* (2013.01); *C08K 7/00* (2013.01); *C08L 83/04* (2013.01); *H01F 5/06* (2013.01)

(56) References Cited

U.S. PATENT DOCUMENTS

| | | | |
|---|---|---|---|
| 3,632,440 A | 1/1972 | Preston | |
| 3,686,030 A | 8/1972 | Preston | |
| 3,779,991 A | 12/1973 | Preston | |
| 4,376,834 A | 3/1983 | Goldwasser et al. | |
| 4,499,149 A * | 2/1985 | Berger | C07F 7/0889 257/788 |
| 4,693,936 A | 9/1987 | McGregor et al. | |
| 6,054,224 A | 4/2000 | Nagai et al. | |
| 6,214,462 B1 * | 4/2001 | Andre | C08G 18/10 174/110 N |
| 2001/0020081 A1 * | 9/2001 | Ishikawa | C08G 77/455 528/28 |
| 2002/0041960 A1 | 4/2002 | Fournier et al. | |
| 2003/0215650 A1 * | 11/2003 | Studer | C08G 77/42 428/447 |
| 2004/0052649 A1 | 3/2004 | Murase et al. | |
| 2006/0065427 A1 | 3/2006 | Kummer et al. | |
| 2007/0298255 A1 | 12/2007 | Banerjee et al. | |
| 2008/0213599 A1 | 9/2008 | Webster et al. | |
| 2010/0280148 A1 * | 11/2010 | Webster | C08G 18/089 523/122 |

FOREIGN PATENT DOCUMENTS

| | | |
|---|---|---|
| CN | 101691466 A | 4/2010 |
| DE | 2000638 A1 | 7/1970 |
| DE | 2033608 | 3/1971 |
| DE | 2142598 | 3/1972 |
| DE | 3702542 | 8/1988 |
| DE | 4217603 A1 | 12/1992 |
| EP | 217364 A2 | 4/1987 |
| EP | 447789 A1 | 9/1991 |
| EP | 1176611 A1 | 1/2002 |
| GB | 1317178 | 5/1973 |
| JP | 61185527 A | 8/1986 |
| JP | 05101713 A | 4/1993 |
| JP | 06166741 A | 6/1994 |
| JP | 09048920 A * | 2/1997 |
| JP | 09087532 A | 3/1997 |
| JP | 2000026724 A | 1/2000 |
| JP | 2000239426 A | 9/2000 |
| WO | 2006086092 | 8/2006 |
| WO | WO 2009025924 * | 2/2009 |
| WO | 2010042804 | 4/2010 |
| WO | 2012020068 | 2/2012 |

OTHER PUBLICATIONS

Ekin et al., "Synthesis, Formulation, and Characterization of Siloxane-Polyurethane Coatings for Underwater Marine Applications Using Combinatorial High-Throughput Experimentation", J. Coat. Technol. Res., 4 (4) 435-451, 2007.

Fang et al., "Microphase Separation Behavior on the Surfaces of PEG-MDI-PDMS Multiblock Copolymer Coatings", Applied Surface Science 253.5 (2006): 2978-2983.

Fang et al., "Fouling Release Nanostructured Coatings Based on PDMS-polyurea Segmented Copolymers", Polymer 51 (2010) 2636-2642, XP027060689.

Uhlmann et al., "Surface Functionalization by Smart Binary Polymer Brushes to Tune Physico-Chemical Characteristics at Biointerfaces", e-Polymers 2005, No. 075, ISSN 1618-7229.

WPI/Thomson English Abstract of JP61185527 (previously cited May 22, 2014), Jan. 23, 2014.

* cited by examiner

Monodicarbinol side-chain-modified PDMS, n = 60-80

Monocarbinol side-chain-modified PDMS, n = 60-140

PDMS caprolactam copolymer

Bis-diglycidylether side-chain-modified PDMS, n = 20-120

Bis-hydroxyalkyl side-chain-modified PDMS, n = 20-120

Bis-aminoalkyl side-chain-modified PDMS, n = 20-120

Aminopropylmethylsiloxane dimethylsiloxane copolymer, 50-150 Si units

Chain-end-modified polyamide-imide

Polysiloxane chain having polyamide-imide units bonded thereto

Modified linker-bonded polyamide-imide units

Modified polyamide-imide polydimethylsiloxane block copolymer

ELECTRICAL INSULATION ENAMELS COMPOSED OF MODIFIED POLYMERS AND ELECTRICAL CONDUCTORS PRODUCED THEREFROM AND HAVING IMPROVED SLIDING CAPACITY

PRIOR RELATED APPLICATIONS

This application is a National Phase application of International Application No. PCT/EP2011/063796 filed Aug. 10, 2011, which claims priority to DE 102010039168.9 filed Aug. 10, 2010, each of which is incorporated herein by reference in its entirety.

The present invention relates to electrical insulation enamels which contain a polymer comprising a base polymer and modifying units which are incompatible with the base polymer after the polymer has cured and lead to the formation of separate phases at the surface, and to processes for production thereof. The electrical insulation enamels have a low coefficient of friction and frictional resistance are preferably suitable for the coating of wires.

Electrical insulation enamels are used for coating wires which are used as electrical conductors in electrical components such as coils, rotors and stators. So as to produce these electrical components, the coated wire is wound up using automated winding machines. In this context, the enamelled electrical wires should not be damaged on the edges of the electrical components, and should be easy to insert into the grooves of the components, in such a way that a high packing density of the wire in the electrical components can be achieved. High packing densities are necessary so as to achieve optimum induction performance. A high packing density is also desirable because electrical machines, such as electric motors, which contain electrical components of this type are increasingly being miniaturised, since smaller and smaller devices and components are increasingly sought after.

Therefore, so as to avoid incorrect laying of the wire in the electrical components and to achieve high packing densities, the insulated electrical conductors should have a good sliding capacity. A good sliding capacity further makes it possible to process the wire in modern high-speed winding robots, in which wire systems, braking systems and guide systems place extremely high stresses on the wire. A good sliding capacity of the wire and the resulting sliding of the wires against one another improve the winding pattern on the coil. For these reasons, the feature of sliding capacity of wires has developed into an important quality feature for the production and processing of insulated wires.

Conventionally, so as to achieve a good sliding capacity of wires, an electrical insulation enamel is initially applied which is based on self-crosslinking polyesters and polyesterimides, polyimides and polyamide-imides and polyamides and polyesters which are crosslinked with blocked polyisocyanate adducts. Once the actual electrical insulation layer has been applied to the wire, a lubricant is applied as an outer layer. Natural waxes, montan waxes, polyethylene waxes and copolymers comprising propylene polymers of high α-olefins, polypropylene oxides, esters of high-functionality polyols and long-chain fatty acids are used as lubricants. However, the use of lubricants of this type can be problematic, since in particular lubricants based on hydrocarbons, fatty acid esters and polypropylene oxides are no longer stable at the very high application temperatures of over 450° C. which are usual for electrical insulation enamels. Lubricants based on paraffin wax are usually in the form of a solution in petroleum spirit. However, because of the evaporating petroleum spirit, lubricants of this type are problematic for environmental reasons and for health protection reasons.

WO 2007/045575 discloses a lubricant for enamelled wires based on a polytetrafluoroethylene dispersion, which is intended to have improved coefficients of friction and is environmentally friendly. However, the lubricant has to be applied to the previously enamelled wire in a separate process step.

A further approach to providing electrical insulation enamels having a good sliding capacity involves mixing a lubricant into the enamel. An enamel of this type is disclosed for example in EP 0 823 120, in which the enamel contains polyethylene wax as an internal lubricant.

In a further approach to improving the sliding capacity of electrical insulation enamels, the polymers contained in the enamel are functionalised with components. EP 0 033 224 and EP 0 072 178 disclose electrical insulation enamels based on polymers, for example polyamide-imides, which are modified with terminal long-chain alkyl groups.

Electrical insulation enamels are further known in which polysiloxanes are physically mixed into the enamel or in which the polymers contained in the enamel are functionalised with polysiloxanes. For example, EP 1 176 611 discloses insulated wires which comprise a polyamide-imide resin which is terminally modified with alkoxysiloxanes or aryloxysiloxanes which contain a glycide ether group. EP 0 447 789 discloses insulation enamels which contain a copolymer functionalised with polysiloxanes. The polysiloxanes used are not disclosed in greater detail. DE 20 00 638 (U.S. Pat. No. 3,632,440) also discloses an insulation material in which polysiloxanes are mixed into a polymer resin or the polymer resin is functionalised by polysiloxanes. Functionalising the polymer resin with long-chain polysiloxanes is not mentioned. US 2003/0215650 discloses the modification of polymer compounds with short-chain polysiloxanes.

An object of the invention is to provide an electrical insulation enamel which has a very good sliding capacity on the surface together with a high thermal resistance, flexibility and good dielectric properties.

This object is achieved in accordance with the invention by providing an electrical insulation enamel which contains a functionalised polymer comprising a base polymer and modifying units which are incompatible with the base polymer after the polymer has cured, in particular thermally cured. The modifying units are in particular polysiloxanes. The modifying units are incompatible with the base polymer after curing or film formation, in such a way that self-structuring of the surface takes place. In this context, a phase separate from the base polymer is formed, and is present in particular at the outer surface of the cured enamel film and improves the sliding capacity properties of the enamel film.

The invention combines the advantageous properties of a base polymer, for example chemical stability and/or hardness, with the advantageous properties of the modifying units, for example reduced adhesion and/or reduced friction. Since the modifying units are chemically fixed and in particular covalently bonded to the base polymer, the modifying units are prevented from being deposited on the environment and in particular from bleeding out.

The electrical insulation enamel thus has in particular a phase separation on the surface, that is to say separate regions on the surface formed from base polymer, and other separate regions formed from modifying units. It has been found that the cured enamel according to the invention has a structured anisotropic surface consisting of polar matrix and non-polar separate regions. It has also been possible to establish differences in the mechanical properties, namely in particular a rigid polar matrix, in particular a rigid polar base polymer matrix and particularly preferably a rigid polar polyamide-imide matrix, and soft, "liquidy" separate regions, formed from modifying units, in particular polysiloxanes, and even more preferably PDMS phase separations.

Electrical insulation enamels are usually in the form of colloidal solution or a dispersion of polymer particles in a solvent. The polymer particles may be in the form of colloidal particles or in the form of gel particles. Gel particles may have modifying units on the outside, for example in a brush structure. Further components such as additives may be present if appropriate.

The polymers contained in the electrical insulation enamel according to the invention comprise a base polymer which is functionalised or modified with modifying units. The base polymers may for example be selected from the group consisting of polyamide-imides, polyester-imides, polyesters, polyamides, polyurethanes, polyimides, polyester-amide-imides, polyepoxides, and mixtures or combinations thereof. In a preferred embodiment, the base polymer is a polyamide-imide and/or a polyester-imide, most preferably a polyamide-imide. The production of polymers of this type is known.

The base polymer may be selected depending on the intended use. For use in electrical insulation enamels, polyamide-imides and/or polyester-imides are preferably used.

The polymers according to the present invention contain a base polymer which has at least one modifying unit. The modifying unit is in particular a polysiloxane, preferably a polydialkylsiloxane and more preferably a polydimethylsiloxane. The modifying units are in particular coupled covalently to the base polymer.

As well as the polymer, the electrical insulation enamel also comprises solvents, which are disclosed in the following. The solids content of the polymer in the electrical insulation enamel is usually at least 10%, at least 20%, at least 25%, at least 30%, at least 35% and up to 45%, 50%, 60% or 70% (mass/mass). The electrical insulation enamel may contain additives, which are disclosed in the following, as further components.

Surprisingly, it has been found that in the cured electrical insulation enamel, which can be obtained by curing, in particular thermal curing, separate regions occur on the surface. As a result, the coefficient of friction and the frictional resistance of the cured electrical insulation enamels are improved. At the same time, good thermal resistance and flexibility are still obtained.

Modifying units according to the present invention are distinguished in that when an enamel which contains a polymer comprising units of this type is applied to a metal plate, for example an aluminium plate, or to a glass plate of a thickness of 5 µm to 20 µm, and after thermal curing, at a firing temperature of over 100° C., for example 150° C., 200° C., 220° C., 250° C. or 300° C., in particular of 250° C., and a firing duration of 2 to 15 minutes, preferably 10 minutes, separate regions are present on the surface. The proportion of these regions based on the total surface area may for example be determined by atomic force microscopy.

The proportion of the separate regions on the surface in which modifying units are found—in particular when the content of blocks comprising modifying units is 20% by mass based on the polymer as a whole—is preferably at least 5% by area, at least 15% by area, at least 20% by area, at least 30% by area, at least 40% by area, at least 50% by area and up to 60% by area, up to 70% by area, up to 80% by area, up to 90% by area or up to 95% by area, based on the surface as a whole. Accordingly, the proportion of regions on the surface in which base polymer is found is at least 5% by area, at least 15% by area, at least 20% by area, at least 30% by area, at least 40% by area, at least 50% by area and up to 60% by area, up to 70% by area, up to 80% by area, up to 90% by area or up to 95%, based on the surface as a whole.

The individual separate regions are preferably of a size of at least 0.1 µm, preferably at least 0.2 µm. The size of the separate regions may vary considerably, and may also be in the range of up to several µm, in particular up to 10 µm, preferably up to 5 µm.

In one embodiment, the modifying units which are incompatible with the base polymer after curing or film formation are long-chain polysiloxanes. Polysiloxanes are chains of silicon atoms which are bonded to nitrogen atoms. The free valences of the silicon may be occupied by side chains. In a preferred embodiment, the side chains are mutually independently alkyl, alkoxy, alkenyl, alkynyl, which are optionally substituted with halogen, OH, COOH and/or amino. Preferred side chains are alkyl, preferably $C_1$-$C_6$ alkyl, in particular methyl. Accordingly, polydialkylsiloxanes (PDAS) and in particular polydimethylsiloxanes (PDM) are particularly preferred as modifying units.

The end groups of the polysiloxanes may mutually independently be functional groups selected from alkyl, alkoxy, alkoxy alkyl, alkynyl, aryl or heteroaryl, which may optionally be substituted with halogen, OH, COOH, cycloalkyl, epoxides and/or amino. The polysiloxanes are bonded to the base polymer via one or both end groups and/or one or more side chains. The bonding takes place via at least one reactive group, which comprises for example OH—, SH—, COOH—, $NH_2$, CN—, OCN—, anhydride, epoxy and/or halogen groups and has reacted with a complementary reactive group on the base polymer. There may be one or more reactive groups, preferably one or two reactive groups on one or both ends of the siloxane. Particularly preferably, there are two reactive groups on one end of the polysiloxane.

The modifying units are preferably introduced into the base polymer via modified blocks, for example monomers, which comprise the modifying units, bonded via reactive groups, which undergo a polymerisation reaction with unmodified blocks.

In a preferred embodiment, modifying units comprising a reactive group can be introduced into the polymer which is to be functionalised in that they are initially reacted for example with a trimeric monomer unit, such as a trimeric isocyanate adduct, in a molar ratio of 1:1. The resulting compound may subsequently react with for example the remaining isocyanate group comprising the remaining reactive groups of the further monomers, and thus form a chain segment of a functionalised polymer.

Polysiloxanes consist of a plurality of siloxane units (Si units), which are bonded to one another via nitrogen atoms. The polysiloxanes may comprise 20 to 500 Si units, preferably 40 to 400 Si units, particularly preferably 50 to 200 Si units, and most preferably 60 to 150 Si units. "Long-chain polysiloxanes" refers in particular to polysiloxanes which comprise at least 20, more preferably at least 30, even more preferably at least 40 and in particular at least 60 Si units, and preferably up to 500, particularly up to 300, in particular up to 200 and most preferably up to 150 Si units.

In a preferred embodiment, the polysiloxanes are polydialkylsiloxanes, in particular polydimethylsiloxanes (PDMS). Suitable polydimethylsiloxanes are for example

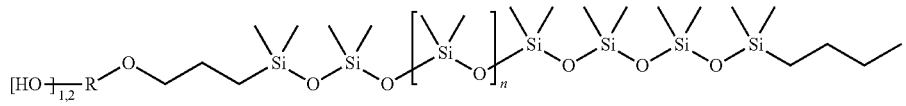

α-hydroalkoxy-ω-alkylpolydimethylsiloxanes (Formula I),

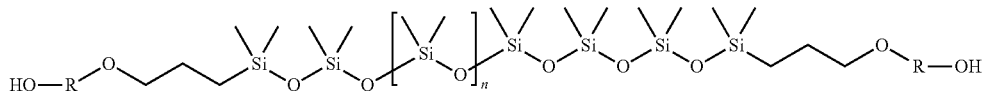

bis-(hydroxyalkoxyethyl)-polydimethylsiloxanes (Formula II),

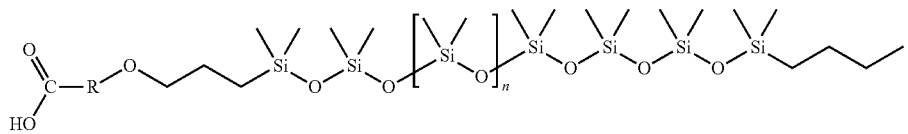

α-carboxyalkoxypropyl-ω-butyl-polydimethylsiloxanes (Formula III), and

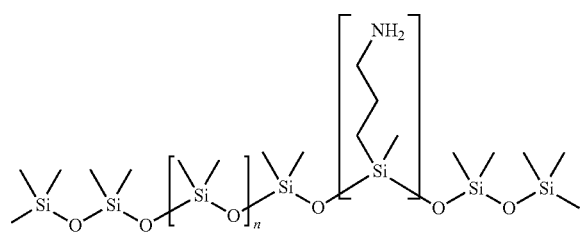

aminoproylpolydimethylsiloxanes (Formula IV). n is selected so as to give chain lengths in the range specified above. R represents an alkyl functional group, in particular an alkyl functional group comprising 1 to 30, in particular 2 to 6 carbon atoms.

Preferably, monofunctional or difunctional polydimethylsiloxanes are used. An α-difunctional polydimethylsiloxane is particularly preferred, for example as shown in Formula I. FIG. 2 shows some polydimethylsiloxanes by way of example. In a particularly preferred embodiment, the polydimethylsiloxane is α-(2,2-dimethylolbutoxy)-propyl-ω-n-butylpolydimethylsiloxane. The production of polydimethylsiloxanes of this type is known, as disclosed for example in EP 0 430 216.

Even at relatively high contents by mass, because of the relatively high molar mass thereof, polysiloxanes reduce the average molar mass of the polymers, in particular of polyamide-imides and polyimides, by less than smaller molecular blocks at comparable contents by mass. Therefore, the film properties of the electrical insulation enamels are virtually unaffected by the introduction of the modifying units.

In the polymer according to the invention, there are various embodiments for the arrangement of the modifying units, for example the polysiloxanes, and the base polymer.

Modifying units may form chain-end-modified polymers (see for example FIG. 3a) or a polymer chain of the modifying units with units of the base polymer bonded thereto (see for example FIG. 3b) with the base polymer.

Difunctional or polyfunctional modifying units may form a linker-bonded polymer (see for example FIG. 3c) or a block copolymer (see for example FIG. 3d) with units of the base polymer. In this context, the modifying unit is preferably used which has two reactive groups on one of the end groups and no reactive group on the other end group. This leads to the modifying group being inserted into the base polymer as a linker (see FIG. 3c). Alternatively, an α,ω-difunctional unit may be used, which has reactive groups on each end group. This leads to the formation of a block copolymer (see also FIG. 3d).

Figure 3A:
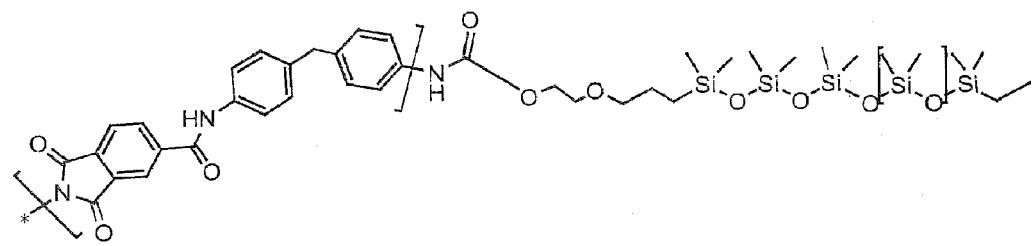
Figure 3B:
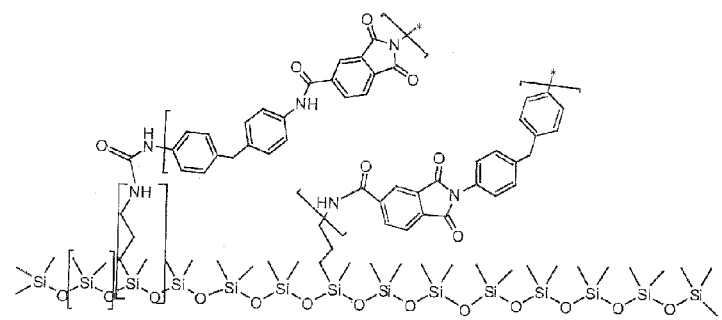
Figure 3C:
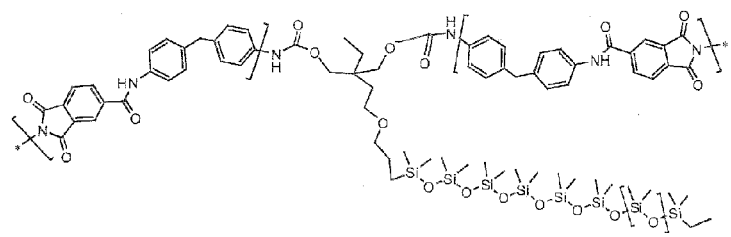

In a preferred embodiment, linker-bonded base polymer, in particular linker-bonded polyamide-imide and/or polyester-imide, is used, polysiloxane, in particular polydimethylsiloxane, which preferably has 60 to 80 Si units, for example approximately 65 Si units, acting as the linker between the base polymer units, in particular polyamide-imide polymer units and/or polyester-imide units (see FIG. 3c).

In a further preferred embodiment, end-group-modified base polymer, in particular end-group-modified polyamide-imide and/or polyester-imide, is used, the polysiloxane used, in particular polydimethylsiloxane, preferably comprising 60 to 80 Si units, for example approximately 65 Si units (see FIG. 3a).

In a further preferred embodiment, side-chain-functionalised modifying units, for example functionalised with aminoalkyl groups, are used, and react with reactive groups, for example isocyanate groups, of the base polymer, for example of a polyamide-imide and/or of a polyester-imide (see also FIG. 3b).

Figure 3D:
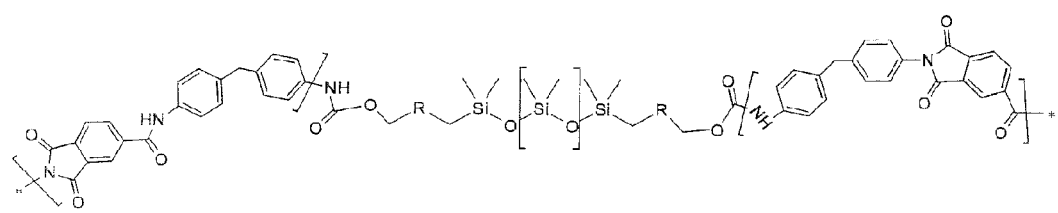

In yet another embodiment, functionalised polymers are used in which α,ω-bis-hydroxyalkyl-terminated polysiloxanes, in particular α,ω-bis-hydroxyalkyl-terminated polydimethylsiloxanes, form a block copolymer with the base polymer, for example a polyamide-imide and/or a polyester-imide (see FIG. 3d).

Particularly advantageous results are achieved in relation to the sliding capacity of the electrical insulation enamel if combinations or mixtures of polymers are used comprising a plurality of different modifying units which are of different chain lengths, for example which have a different number of Si units. For example the combination of polymers is particularly preferred in which the first polymer is functionalised with a polysiloxane, in particular a polydimethylsiloxane, comprising approximately 60-80 Si units, and the second polymer is functionalised with a polysiloxane, in particular a polydimethylsiloxane, comprising approximately 120-140 Si units. The mass ratio of the first and second polymer is for example 10:90 to 90:10, preferably 30:70 to 70:30, particularly preferably 40:60 to 60:40, for example 50:50.

In a preferred embodiment, a chain-end-modified base polymer, in particular a chain-end-modified polyamide-imide and/or polyester-imide (see FIG. 3a), the end groups comprising 120-140 Si units, for example approximately 132 Si units, is mixed in a mass ratio of 0.8:1.2 to 1.2:0.8, and in particular of 1:1, with a linker-bonded base polymer, in particular a polyamide-imide and/or polyester-imide (see FIG. 3c), the polysiloxane linker comprising 50 to 70 Si units, for example approximately 65 Si units.

The content of the blocks comprising modifying units, based on the polymer as a whole, is preferably 2 to 70% by mass, preferably 5 to 50% by mass, and particularly preferably 10 to 30% by mass. A content of the blocks comprising modifying units of 15-25% by mass is most strongly preferred. Polymers comprising a higher content of modifying units may be mixed with polymers comprising no modifying units. It is also possible to use mixtures of polymers comprising modifying units which contain different percentages by mass of modifying units with other polymers which do not contain any modifying units.

To produce the polymer comprising a base polymer and modifying units, polyols for example, which are used for the production of polyesters and polyester-imides, can be reacted with carboxyl groups and anhydride groups of the modifying units so as to form esters. Polycarboxylic acids and polycarboxylic acid anhydrides, which are used for the production of polyesters, polyamides, polyester-imides, polyamide-imides and polyimides, can be reacted with OH groups of the modifying units so as to form esters and with amino groups so as to form amides. Polyisocyanates, which are used for the production of polyester-imides, polyamide-imides and polyimides, can be reacted with OH groups of the modifying units so as to form urethane groups. Polyisocyanates can also be reacted with amino groups of the modifying units so as to form urea groups.

For the production of self-crosslinking polyesters, terephthalic acid or terephthalic acid dimethyl ester and/or isophthalic acid, glycerol or trishydroxyethyl isocyanurate and/or ethylene glycol are preferably used as monomers. These monomers can also be used for the production of polyesters for crosslinking with blocked polyisocyanates.

Polyamides for electrical insulation enamels preferably consist of aliphatic dicarboxylic acids and diamines and/or of lactams or aminocarboxylic acids.

Terephthalic acid or the dimethyl ester of terephthalic acid, trimellitic acid anhydride, glycerol or trishydroxyethyl isocyanurate and ethylene glycol are preferably used as monomers for the production of polyester-imides.

Polyimides can be produced from tetracarboxylic acid dianhydrides, pyromellitic acid dianhydride (PMDA, 1,2,4, 5-benzene tetracarboxylic acid dianhydride) preferably being used, and aromatic diisocyanates, 4,4' diisocyanatodiphenyl oxide and/or 4,4' diisocyanatodiphenyl methane (MDI) preferably being used.

Polyamide-imides can be produced from tricarboxylic acid anhydrides, trimellitic acid dianhydride (TMA, 1,2,4- benzene tricarboxylic acid anhydride) preferably being used, and aromatic diisocyanates, 4,4'-diisocyanatodiphenyl methane preferably being used.

A further subject-matter of the invention is a cured electrical insulation enamel which can be obtained by curing, in particular thermally curing, an electrical insulation enamel according to the invention, there being separate regions on the surface of the cured electrical insulation enamel.

In this context, thermal curing comprises in particular thermal treatment at 400° C. to 700° C., preferably at 450° C. to 600° C. and even more preferably at 525° C. to 625° C.

A further aspect of the present invention is a process for the production of the electrical insulation enamel according to the invention, characterised in that a first modified block, for example a monomer or a prepolymer, which comprises at least one modifying unit, is polymerised with at least one second monomer, so as to obtain a polymer comprising modifying units, which is formulated together with a solvent and optionally additives so as to form an electrical insulation enamel.

In a particularly preferred embodiment, the electrical insulation enamel according to the invention is produced in that a diisocyanate comprising a polysiloxane is reacted with reactive groups, for example OH, COOH or $NH_2$, and the reaction product, for example a prepolymer, is subsequently polymerised with an acid anhydride.

The produced polymers, which are in the form of colloidal solutions or dispersions, are completed so as to form electrical insulation enamels which are capable of application. The polymers can be diluted to the desired viscosity using suitable solvents. Preferably, the enamels which are capable of application have a viscosity of 10 to 2500 mPa·s, preferably 100 to 800 mPa·s and particularly preferably 200 to 500 mPa·s.

Suitable solvents for producing electrical insulation enamels are for example cresols and xylenols, which optionally have a content of phenol, glycol ether, for example an oligoglycol ether such as methyl diglycol, glycol ether esters, such as butyl glycol acetate, propylene carbonate, higher alcohols, such as benzyl alcohol and diacetone alcohol, and higher ketones, such as isophorone. To control the viscosity, for example in relation to the solids for application, diluents may be used, for example aromatic hydrocarbons such as xylenes and $C_3$-$C_5$ aromatics, which may also contain alkyl naphthaline. Examples include Solvesso®100, Solvesso®150 and Solvesso®, commercial products from Exxon.

If polyisocyanates are used for the production of the functionalised polymers, polar solvents without reactive hydrogens are preferably used, such as N-methylpyrrolidone, N-ethyl pyrrolidone or N,N-dimethyl acetamide. These process solvents constitute a component of the electrical insulation enamel.

Further, additives such as catalysts and crosslinking partners are optionally added. According to the present invention, the catalysts are for example ester interchange catalysts, such as tetrabutyl titanate, or urethane exchange catalysts, such as organic tin salts. If polyesters are used as polymers, the amounts of blocked polyisocyanate necessary for the urethane crosslinking, for example isomer mixtures and derivatives of diisocyanatodiphenyl methane, blocked with cresols, may be added as crosslinking partners. Further additives may for example be defoaming agents and levelling agents.

A further aspect of the present invention relates to a process for the production of a coated wire, characterised in that a first modified block, for example a monomer or a prepolymer, is polymerised with at least one modifying unit comprising at least a second monomer, so as to obtain a polymer comprising modifying units, which is formulated together with a solvent and optionally additives so as to form an electrical insulation enamel, and the electrical insulation enamel is applied to a wire and subjected to a firing process, there being separate regions on the surface of the cured electrical insulation enamel.

During the firing process, the film formation process of the electrical insulation enamel takes place. In this context, the solvents evaporate and crosslinking reactions possibly take place. On the other hand, a phase separation of the polymer and the modifying units which are incompatible therewith takes place during the firing process. As a result, the modifying units are orientated on the surface of the electrical insulation enamel, resulting in an improved sliding capacity being achieved. The phase separation leads to an inhomogeneous surface of the electrical insulation enamel, which becomes apparent as a result of a changed surface structure by comparison with electrical insulation enamel without modifying units. It is currently assumed that the incompatibility of the polymer with the modifying units results from the tendency of the polymer content to form polar interactions and from the tendency of the modifying units towards non-polar interactions.

The electrical insulation enamel according to the invention is preferably used for application to a wire, in particular to a copper wire. Preferably, the wire constitutes an electrical conductor. An electrical conductor in accordance with the present invention is a medium which has freely movable charge carriers and is therefore capable of transporting electrical current. Preferred electrical conductors according to the present invention are metals or metal alloys, in particular copper and aluminium.

Wires are conventionally coated with different enamel materials in a multi-layer process. In a preferred embodiment, the electrical insulation enamel according to the invention is therefore applied as an outer layer to a wire which is already coated with an electrical insulation enamel without modifying units. The wire to which the electrical insulation enamel according to the invention is applied as an outer layer can contain one or more electrical insulation enamels without modifying units as lower layers.

Preferably, the electrical insulation enamel which is produced according to the invention is applied to wires, preferably copper wires, using conventional enameling machines, which may be in a horizontal and vertical arrangement. The wires may have diameters of 0.01 to 10 mm, preferably 0.01 to 3.0 mm, and may be flat wires or profile wires. The electrical insulation enamel is applied in 2 to 40 immersions, preferably 4 to 30, more preferably in 8 to 25 immersions, for example using felt strippers or nozzle strippers. Subsequently, curing is carried out. In this context, the electrical insulation enamel is preferably fired in a circulating furnace having circulation temperatures of 400° C. to 700° C., preferably 450° C. to 600° C., more preferably 525° C. to 625° C. In a preferred embodiment, the enameling process is continuous, and the enamelled wires travel at haul-off speeds of 20 to 250 m/min, preferably 60 to 200 m/min, more preferably 80 to 140 m/min.

A further subject-matter of the invention is a wire, in particular a copper wire, which is coated with the electrical insulation enamel according to the invention. A further preferred subject-matter of the invention is a wire, in particular a copper wire, which comprises an electrical insulation enamel without modifying units and comprises an electrical insulation enamel according to the invention as an outer layer or layers.

The wires according to the invention comprising electrical insulation enamel may be used for various purposes, preferably for the production of coils and windings on rotor armatures and stators for electric motors and generators and for related electrical components.

A preferred embodiment of the invention is a coil which comprises a wire, in particular a copper wire, which is coated with an electrical insulation enamel according to the invention or which comprises an electrical insulation enamel without modifying units and comprises an electrical insulation enamel according to the invention as an outer layer or layers.

Although the wire which is coated according to the invention already has a very good sliding capacity, an external lubricant may additionally be applied as an outer layer.

The invention further relates to the use of a polymer, comprising a base polymer and modifying units which are incompatible with the base polymer after the polymer has cured, as an electrical insulation enamel. The base polymer and the modifying units are in particular the materials stated above, and preferably the materials emphasised above.

In a further embodiment of the invention, the polymers are present in the electrical insulation enamel in the form of gel particles. These gel particles contain modifying units, for example long-chain polysiloxanes and in particular long-chain polydimethylsiloxanes, on the surface thereof. The modifying units may project outwards (polymer brush structure). When a surface which contains a gel particle coating of this type contacts a counter surface, for example a metal or non-metal surface, such as a steel surface or a winding roll of a wire winder, the gel particles are stripped off from the enamel carrier, that is to say the wire, and are thus available on both of the friction partners. This leads to a further reduction in the frictional resistance and thus to a further improvement in the sliding capacity.

The invention further relates to the use of polydialkylsiloxane gel particles in electrical insulation enamels and to electrical insulation enamels comprising polydialkylsiloxane gel particles. In this context, the long-chain polydialkylsiloxanes and in particular polydimethylsiloxanes disclosed above are preferably used as the polydialkylsiloxanes. It has been found that by way of polydialkylsiloxane (PDAS) gel particles of this type, and in particular by way of polydimethylsiloxane (PDMS) gel particles, a further improvement in the sliding properties can be achieved. According to the invention, gel particles of this type are introduced in particular into an electrical insulation enamel. The PDAS gel particles and in particular PDMS gel particles may in this context be introduced into a conventional insulation enamel, but also into a modified insulation enamel as disclosed herein.

The object of the invention is also achieved by way of an electrical insulation enamel comprising a polymer and polysiloxane gel particles. In this embodiment, the advantageous properties of a base polymer, for example chemical stability and/or hardness, are combined with the advantageous properties of the modifying units, for example adhesion reduction and/or friction reduction, in that the release of the modifying units contained in the gel particles to the environment, and in particular bleeding out, is prevented or at least reduced by adding the modifying units as gel particles.

The polysiloxanes which are contained in the polysiloxane gel particles as modifying units are incompatible with the polymer after the polymer has cured. They therefore form separate regions on the surface of the cured electrical insulation enamel after the polymer has cured. At the same time, indirect escape of the modifying units is prevented, since the polysiloxane gel particles are bonded into the cured electrical insulation enamel in a relatively stable manner.

The added polysiloxane gel particles are in particular polydialkylsiloxane gel particles, the alkyl side chains preferably having a length of 1 to 6 carbon atoms, and are particularly preferably polydimethylsiloxane gel particles. The gel particles are in particular crosslinked gel particles.

The base polymers disclosed above, and in particular polyamide-imides, polyester-imides, polyurethanes, polyesters, polyamides, polyimides, polyesteramide-imides, polyepoxides, and mixtures or combinations thereof, may be used as polymers for the electrical insulation enamel. Polyamide-imides and polyester-imides are particularly preferred, and polyamide-imides are most preferred. The polymers may be selected depending on the use of the enamel. In the case of use as an electrically insulated wire, polyamide-imides and/or polyester-imides are used in particular.

The invention further relates to a cured electrical insulation enamel which is obtained by thermally curing an enamel comprising a polymer and polysiloxane gel particles. The thermal curing preferably takes place at temperatures of 400° C. to 700° C., preferably of 450° C. to 600° C., and even more preferably at 525° C. to 626° C.

The present invention further relates to a process for producing an electrical insulation enamel in which a polysiloxane gel particle dispersion is mixed into an enamel containing a polymer. The enamel containing a polymer may be a conventional enamel or an enamel which is modified as disclosed above.

The gel particles may in particular be mixed into polymeric coatings and bulk materials, in particular into enamels, as friction-reducing components. In particular in enamels based on the polymers disclosed herein, and particularly preferably in electrical insulation enamels, for example based on polyamide-imide or polyester-imide, a major reduction in the frictional resistance is found. These coatings further have very low adhesion.

It has been found that by way of the siloxane gel particles according to the invention a considerable reduction in the frictional resistance is achieved in coatings, in particular in polyamide-imide-based coatings. Polysiloxane gel particles have the advantage of an "additive solution", that is to say they can be mixed into conventional coating systems or enamels in a simple manner.

It has further been found that gel particles may be transferred from the coating onto the article during the friction process, and thus a further friction reduction, for example by comparison with steel, is achieved.

By contrast, polysiloxane gel particles cannot migrate because of the crosslinking thereof, and have better thermal stability than polydimethylsiloxane polyether block copolymers.

In a preferred embodiment, a polysiloxane gel particle dispersion according to the invention is produced by crosslinking vinyl-group-functionalised polysiloxanes with hydride-group-functionalised polysiloxanes in a dispersing agent. Dispersions can be worked into an electrical insulation enamel so as to provide an enamel having lower friction. However, there is also the option of working in the gel particle dispersion beforehand, during the production of an enamel. The crosslinked gel particles are orientated on the surface of the enamel layer, and lead to a sustained improvement in the sliding capability of the surface which is coated with an enamel of this type.

Polysiloxane gel particle dispersions and production processes for dispersions of this type are further disclosed herein.

According to the invention, in a particularly preferred embodiment these are polydialkylsiloxane gel particles, the alkyl side chains preferably being of a length of 1 to 6 carbon atoms, and these are most preferably polydimethylsiloxane gel particles.

The gel particles are preferably produced as a dispersion of the gel particles in a dispersing agent. The gel particles are preferably synthesised to form a gel particle dispersion in polar media. Preferably, the prepolymers or monomers of the gel particles are insoluble or only poorly soluble in the dispersion media. NMP ((N-methyl-2-pyrrolidone), NEP (N-ethylpyrrolidone), DMAP (dimethylpyrrolidone), DMAc (dimethylacetamide), DMF (dimethylformamide), water or aqueous solutions and/or DMSO (dimethyl sulfoxide) are preferably used as matrix or dispersion agents for the dispersion. A dispersion in N-methyl-2-pyrrolidone is particularly preferred.

A dispersion of this type of polysiloxane gel particles, in particular of PDAS and more preferably of PDMS gel particles, can be mixed into coating systems as a component, and thus act as a friction-reducing component. The emulsion can be stabilised by functional monomers themselves and/or by an emulsifying agent.

The gel particles according to the invention can be produced in various manners. The production of a dispersion from crosslinked polysiloxane gel particles is preferred, in particular from crosslinked polydialkylsiloxane gel particles, and most preferably from crosslinked polydialkylsiloxane gel particles, by means of in situ synthesis. However, the gel particles may also be produced by addition curing (hydrosilylation) or by emulsion polymerisation. In this context, the production may take place in an aqueous or non-aqueous matrix.

Vinyl-functional siloxane prepolymers in combination with hydride-functional siloxane prepolymers are preferably used as the starting material. The reactive groups react with one another by hydrosilylation, and form crosslinked polysiloxane gel particles. The crosslinking may be assisted by way of a suitable catalyst. There is also the option of only using vinyl-functional polysiloxanes and carrying out radical crosslinking, for example by means of a peroxide initiator.

Dispersions comprising PDMS gel particles in NMP (N-methyl-2-pyrrolidone) are particularly preferred.

In a preferred embodiment, the gel particles according to the invention consist exclusively of polysiloxanes, in particular polydimethylsiloxanes, which are bonded to one another via reactive groups, such as vinyl groups or hydride groups. However, it is also possible to provide gel particles which contain a core, in particular an $SiO_2$ core or a polymer core.

The gel particles according to the invention may be used in addition to polymers containing modifying units, for example so as to achieve a reduction in friction. However, there is also the option of using polysiloxane gels instead of modified polymers, that is to say in conventional enamels or coating materials.

In the following, some particularly preferred starting materials for polysiloxane gel particles are described:

Vinyl-terminated polydimethylsiloxanes

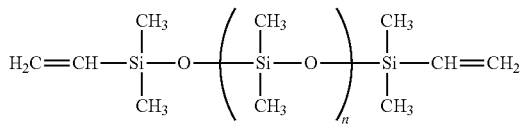

wherein n is a whole number from 0 to 2000. Preferably, n is at least 10, more preferably at least 20, even more preferably at least 30 and up to 1000, more preferably up to 500.

Vinylmethylsiloxane dimethylsiloxane copolymers, trimethylsiloxy-terminated

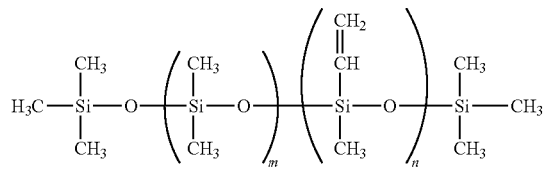

In the formula, the dimethylsiloxane and vinylmethylsiloxane groups may occur in any desired sequence. In this context, n denotes the vinylmethylsiloxane content in mol % and is between 0.5 and 1.5, preferably between 0.8 and 1.2. m represents the content of dimethylsiloxane in mol %, and is calculated as m=100−n.

Vinylmethylsiloxane dimethylsiloxane copolymers, trimethylsiloxy-terminated, are characterised by the viscosities thereof. According to the invention, viscosities of 250 cSt to 500,000 cSt may be used, in particular viscosities of 1000 cSt to 100,000 cSt.

Vinyl-functional Macromers

Macromers of this type serve as "dangling ends" and/or for producing polymer brush surfaces. Suitable vinyl-functional macromers are for example asymmetric monovinyl-terminated polydimethylsiloxanes, in particular compounds of the formula

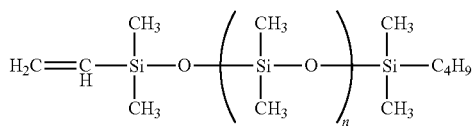

wherein n may be a whole number from 0 to 2000. n is preferably at least 10, more preferably at least 20 and even more preferably at least 30 and up to 1000, more preferably up to 500.

The following structures, for example, may preferably be used as hydride-functional siloxane prepolymers:

Trimethlsiloxy-terminated methylhydrosiloxane dimethylsiloxane copolymers, in particular of general formula

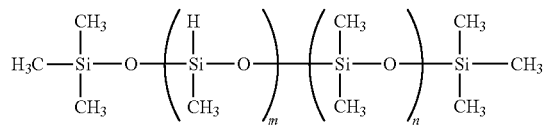

The methylhydrosiloxane and dimethylsiloxane groupings may be in any desired arrangement in the copolymers. In each case, m represents the content of methylhydrosiloxane and n represents the content of dimethylsiloxane units. Terminated trimethylsiloxy-methylhydrosiloxane dimethylsiloxane copolymers having a molar mass of 900 g/mol up to a molar mass of 50,000 g/mol may be used for the production of the gel particles according to the invention.

Hydride-terminated methylhydrosiloxane dimethylsiloxane copolymers, in particular of the formula

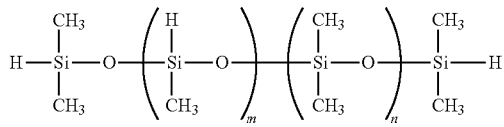

In this context, the dimethylhydrosiloxane and dimethylsiloxane units may be in any desired arrangement. m represents the content of methylhydrosiloxane units and n represents the content of dimethylsiloxane. m, that is to say the content of methylhydrosiloxane in mol %, is preferably 5 to 20, more preferably 7 to 8. n, that is to say the content of dimethylsiloxane in mol %, is preferably 90 to 95, more preferably 92 to 93. Preferably, m, that is to say the content of methylhydrosiloxane units in mol %, is preferably 10 to 90, more preferably 20 to 40, and even more preferably 25 to 30. n, that is to say the content of dimethylsiloxane in mol %, is preferably 50 to 90, more preferably 60 to 80 and most preferably 70 to 75. The molecular weight of the hydride-terminated methylhydrosiloxane dimethylsiloxane copolymers used is preferably 2000 to 2600 g/mol.

Hydride-terminated polydimethylsiloxanes, in particular of the formula

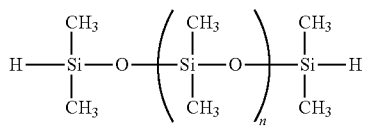

wherein n is a whole number from 3 to 300, in particular from 4 to 230.

Crosslinked siloxane gel particles, in particular dispersions of crosslinked PDMS gel particles, may advantageously be worked into enamel or coating systems. Preferably, the PDMS gel particle dispersions which are preferred herein are worked into NMP in conventional NMP-based polyamide-imide enamels, in particular electrical insulation enamels. They may be worked in for example using a Dispermat or an Ultra-Turrax. It is also possible to work the gel particles into modified enamels, in particular into modified polyamide-imide electrical insulation enamels. The gels, in particular in the form of a gel particle dispersion, may also be worked into other enamels and in particular into other electrical insulation enamels, for example into polyester-imide electrical insulation enamels, polyester electrical insulation enamels, polyimide electrical insulation enamels, polyamide electrical insulation enamels/thermosetting enamels and/or polyurethane electrical insulation enamels/thermosetting enamels.

In a further preferred embodiment, the gel particles are gel particles comprising a hard silica core, in particular PDMS brush particles comprising a hard silica core. In this context, silicate particles are used as starting particles. Particles of this type preferably consist of pyrogenic silicic acid. Preferably, silicon dioxide particles are used, of which the surfaces comprise hydroxyl and/or vinyl groups. Siloxanes are subsequently suspended on the hydroxyl and/or vinyl groups of the silicon dioxide particles. This may take place by adding a hydride-functional siloxane, optionally in the presence of a catalyst, for example a platinum catalyst. The bonding takes place by way of a hydrolysis reaction. The hydride-functional siloxane which is used may comprise one or more Si—H functions. The molar mass may also be varied, and is preferably between 200 and 100,000, more preferably between 500 and 5000 g/mol.

Alternatively, a hydride-functionalised siloxane may be reacted with a vinyl-functional silazane. Subsequently, the vinyl-terminated or silazane-terminated siloxane can react with hydroxyl groups of silicate particles. Alternatively, chlorodialkyl vinyl silanes, in particular chlorodimethyl vinyl silanes, may also be used.

In the following, the invention is explained by way of preferred embodiments and drawings, although these do not limit the scope of protection of the invention.

DRAWINGS

Figure 1B:
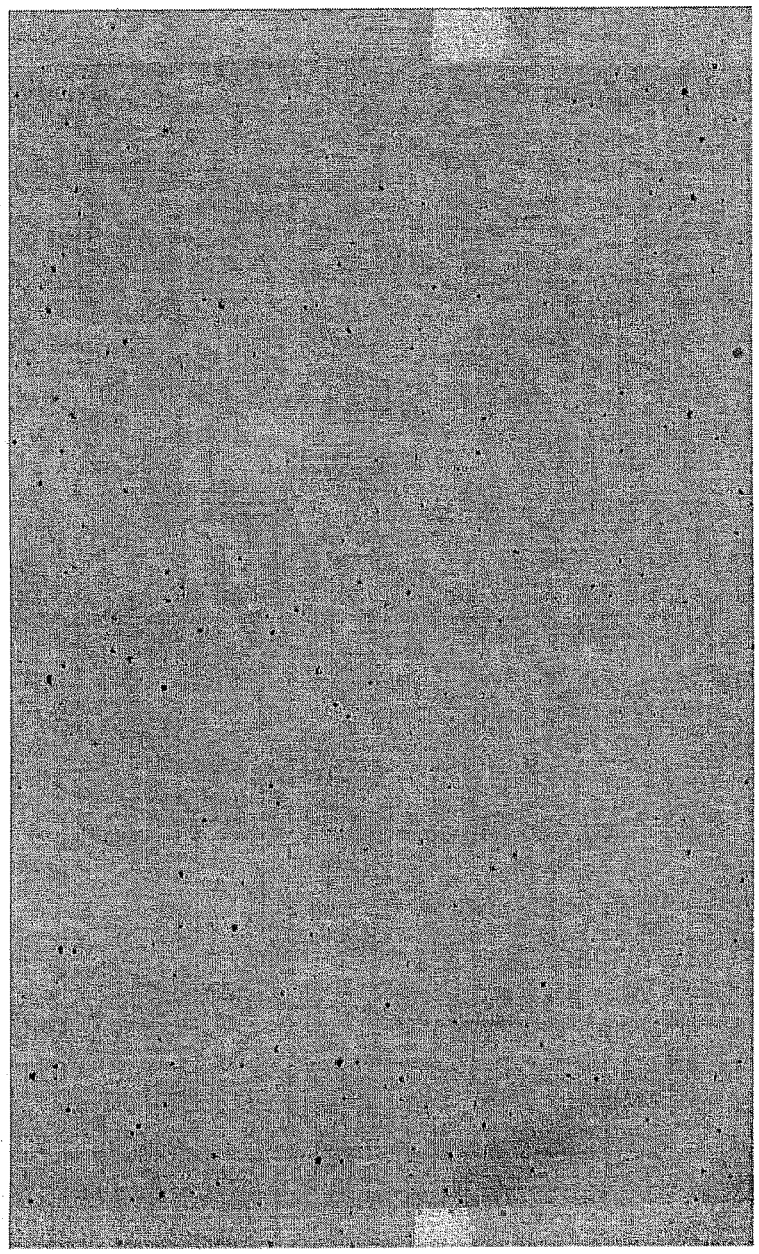
Figure 2A:
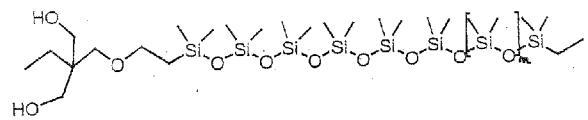
Figure 2B:
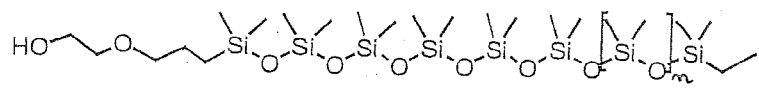
Figure 2C:
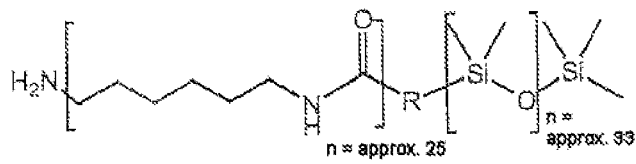
Figure 2D:
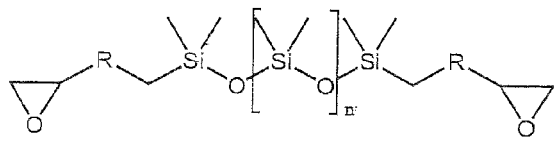
Figure 2E:
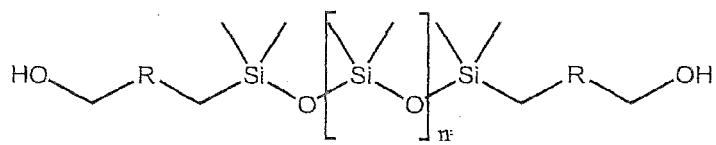
Figure 2F:
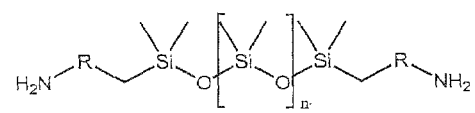
Figure 2G:
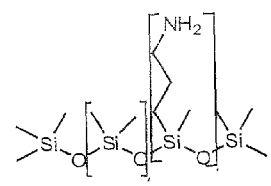

The phase separation of the polymers and the modifying units is clear from FIGS. 1a and 1b.

FIG. 1a is an atomic force microscopy photograph of the surface of the electrical insulation enamel according to the invention based on a polyamide-imide polydimethylsiloxane block copolymer, the polydimethylsiloxanes comprising approximately 63 Si units. The electrical insulation enamel is applied to a metal plate.

A major phase separation can be seen on the surface of the electrical insulation enamel between the modifying units, which can be seen as dark bubbles, and the polymer.

FIG. 1b shows an atomic force microscopy photograph of the surface of an electrical insulation enamel based on a polyamide-imide polydimethylsiloxane block copolymer, the polydimethylsiloxanes comprising approximately 10 Si units. The electrical insulation enamel is applied to a metal plate.

No major phase separation can be seen between the modifying units and the polymer.

The comparison between FIG. 1a, where a polydimethylsiloxane having a chain length of 63 Si units is used, and FIG. 1b, where a polydimethylsiloxane having a much shorter chain length of 10 Si units is used, clearly shows that a phase separation only occurs for a polymer having modifying units according to the present invention.

FIG. 2a-g show suitable polydimethylsiloxanes for the electrical insulation enamel according to the invention.

FIG. 3a-d show various embodiments of the polymers according to the invention.

Figure 4:
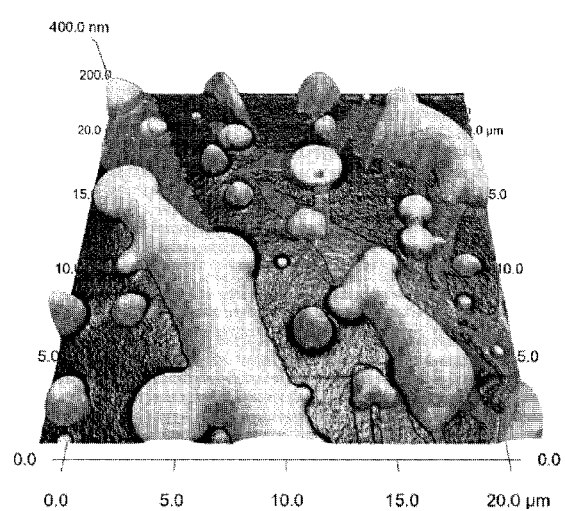

FIG. 4 shows a D3 atomic force microscopy photograph of the surface of a coating of a polyamide-imide which is functionally modified with a polydimethylsiloxane. The brightly displayed regions are mobile but fixed siloxane segments.

EXAMPLES

Example 1

Production of a polyamide having a 20% Content of α-(2,2-dimethylolbutoxy)-propyl-ω-n-butylpolydimethylsiloxane-functionalised polymer 300.0 g N-methylpyrrolidone (NMP) and 250.0 g xylene—as a process solvent—and 293.5 g 4,4'-diioscyanatodiphenylmethane (MDI) are weighed into a glass laboratory reactor of 2 l total volume, equipped with an electrical resistance heater having temperature monitoring and control, comprising an agitator and a reflux cooler and the introduction of protective gas (nitrogen), and the reaction mixture is gently heated. The MDI is dissolved in the previously introduced solvent at 45° C. Subsequently, 104.0 g of the α-(2,2-dimethylolbutoxy)-propyl-ω-n-butylpolydimethylsiloxane, which comprises approximately 63 Si units, are metered in over a period of 15 minutes, whilst the temperature is kept at 45° C. Subsequently, the reaction mixture is heated to 70° C., and is stirred for one hour at 70° C. Subsequently, the reaction mixture is cooled to 45° C., and 218.0 g trimellitic acid anhydride (TMA) are added. Subsequently, the mixture is stirred for one hour at 45 to 50° C. Subsequently, the temperature is increased in steps while stirring: 30 minutes at 65° C., then 30 minutes at 75° C., then 60 minutes at 85° C., then 60 minutes at 100° C., and finally 60 minutes at 130 to 140° C. In the process, the reaction product carboxylic acid dissociates from the carboxyl groups and isocyanate. The reaction mixture reaches a viscosity (measured on a sample in the cone/plate viscometer at 30° C.) of 6 Pa·s. It is cooled to less than 60° C., and 6.1 g ethanol are added so as to halt the reaction. The resulting colloidal solution has a solids content of 48% (measured at 1 hour at 130° C. in the circulating furnace). The content of incompatible polydimethylsiloxane is 20% by mass, based on the polymer as a whole (solids).

Control Example (VB)

Production of a polyamide-imide without Modifying Units

The procedure is the same as in Example 1, but without the addition of the incompatible polydimethylsiloxane. 300.0 g NMP and 250.0 g xylene as a process solvent are weighed into the laboratory reactor described above, and 293.5 g 4,4'-diioscyanatodiphenylmethane are dissolved therein at 45° C. Subsequently, 223.1 g TMA are added. Subsequently, the mixture is stirred for one hour at 45 to 50° C. Subsequently, the temperature is increased in steps while stirring: 30 minutes at 45° C., then 30 minutes at 75° C., then 60 minutes at 85° C., then 60 minutes at 100° C., and finally 60 minutes at 130 to 140° C. In the process, the reaction product carboxylic acid dissociates from the carboxyl groups and isocyanate. The reaction mixture reaches a viscosity (measured on a sample in the cone/plate viscometer at 30° C.) of 6 Pa·s. It is cooled to less than 60° C. The resulting colloidal solution has a solids content of 42.9% (measured at 1 hour at 130° C. in the circulating furnace).

Example 2

Production of a polyamide-imide having a 20% Content of α-(2,2-dimethylolbutoxy)-propyl-ω-n-butylpolydimethylsiloxane-functionalised polymer The procedure is the same as was described in Example 1. The amounts to be weighed in are given in Table 1.

Example 3

Production of a polyamide-imide having a 5% Content of ω-(2,2-dimethylolbutoxy)-propyl-ω-n-butylpolydimethylsiloxane-functionalised polymer The procedure is the same as was described in Example 1. The amounts to be weighed in are given in Table 1.

Example 4

Production of a polyamide-imide having a 20% Content of aminopropyl-polydimethylsiloxane-functionalised polymer 547.6 g NMP and 228.0 g TMA are weighed into the apparatus described in Example 1. The TMA is dissolved while stirring at 70° C. Subsequently, 102.5 g of an aminopropyl polydimethylsiloxane, which comprises approximately 65 Si units, are metered in over a period of 15 minutes. The mixture is heated to 120° C., and subsequently kept at 120° C. for 1 hour so that the polydimethylsiloxane can be reacted to exhaustion. It is subsequently cooled to 40° C. and subsequently 280.0 g MDI are added over a period of one hour. It is heated to 85° C. over a period of 2 hours and subsequently to 130° C., until a viscosity of 6 Pa·s is reached (measured in the plate/cone viscometer at 30° C.). Subsequently, the reaction mixture is cooled. The resulting product has a solids content of 46.9% (measured at 1 hour at 130° C. in the circulating furnace).

Example 5

Production of a polyamide-imide having a 20% Content of hydroxyethoxypropyl-polydimethylsiloxane-functionalised polymer (the polydimethylsiloxane Comprises Approximately 132 Si Units)

The procedure is the same as was described in Example 1. The amounts to be weighed in are given in Table 1.

TABLE 1

Examples of polyamide-imides comprising modifying units and control example

| Components [g] | B1 | B2 | B3 | B4 | B5 | VB |
|---|---|---|---|---|---|---|
| N-methyl-pyrrolidone | 300.0 | 300.0 | 300.0 | 547.6 | 300.0 | 300.0 |
| Xylene | 250.0 | 250.0 | 250.0 | — | 250.0 | 250.0 |
| 4,4'-diioscyan-atodiphenyl methane (MDI) | 293.5 | 293.5 | 293.5 | 270.0 | 293.5 | 146.8 |
| Trimellitic acid anhydride (TMA) | 218.0 | 218.0 | 218.0 | 228.0 | 224.0 | 111.6 |
| α-(2,2-dimethyl-olbutoxy)-propyl-ω-n-butylpoly-dimethylsiloxane | 104.0 | 46.0 | 22.0 | — | — | — |
| Aminopropyl polydimethyl-siloxane | — | — | — | 102.1 | — | — |
| 2-hydroxyethoxy-propyl polydi-methylsiloxane | — | — | — | — | 105.0 | — |
| NMP | — | — | — | 33.1 | — | — |
| Ethanol | 6.1 | 6.1 | 6.1 | 6.1 | 6.1 | — |
| Separated $CO_2$ | 101.4 | 102.4 | 102.85 | 93.7 | 102.8 | 103.2 |
| Total | 1070.2 | 1011.2 | 986.7 | 1093.6 | 1075.2 | 963.4 |
| Solids [%] (1 h, 130° C.) | 48.6 | 45.6 | 44.3 | 46.9 | 48.3 | 42.9 |
| Content of polymer comprising modifying units [%] | 20 | 10 | 5 | 20 | 20 | — |

Examples 6-11

Electrical Insulation Enamels

Electrical insulation enamels were produced from the polymer solutions described in Examples 1-5 and the control example, by adding solvents. The composition of the electrical insulation enamels is shown in Table 2.

TABLE 2

Electrical insulation enamels

| Component [g] | Number of Si units in the poly-dimethyl-siloxane chain | B6 | B7 | B8 | B9 | B10 | B11 |
|---|---|---|---|---|---|---|---|
| Polymer Ex. 1 (20% modification) | approx. 63 | 488.8 | — | — | — | 244.4 | — |
| Polymer Ex. 2 (10% modification) | approx. 63 | — | 502.8 | — | — | — | — |
| Polymer Ex. 3 (5% modification) | approx. 63 | — | — | 488.8 | — | — | — |
| Polymer Ex. 4 (20% modification) | approx. 65 | — | — | — | 502.8 | — | — |
| Polymer Ex. 5 (20% modification) | approx. 132 | — | — | — | — | 244.4 | — |
| Polymer control example | — | — | — | — | — | — | 502.8 |
| N-methyl-pyrrolidone | | 156.2 | 119.8 | 98.5 | 617.5 | 118.4 | 82.9 |
| N,N-dimethyl-acetamide | | 32.3 | 31.2 | 29.4 | 56.1 | 30.4 | 29.3 |
| Total | | 677.4 | 653.8 | 616.7 | 1176.4 | 637.6 | 615.0 |
| Solids [%] (60 min., 130° C.) | | 35.1 | 35.1 | 35.1 | 20.0 | 35.1 | 35.1 |
| Viscosity [mPa · s] (plate/cone viscosity) | | 710 | 860 | 780 | 350 | 660 | 830 |

Applications of the Electrical Insulation Enamels

The electrical insulation enamels shown in Table 2 were enamelled on a horizontally operating wire enameling machine at an ambient temperature of at most 605° C. The blank wire diameter was 0.53 mm, and the haul-off speed was 122 m/min. The application was carried out by way of immersions using nozzle strippers. There was a total of 10 passes. The application for the first 7 passes consisted of a conventional commercial polyester-imide electrical insulation enamel, using a nozzle sequence of 560/570/570/580/580/590/590 μm. The following 2 applications consisted of a conventional commercial polyamide-imide electrical insulation enamel, using a nozzle sequence of 590/600 μm. The final application consisted of the insulation enamel according to the invention in accordance with Examples 6-10 or the enamel from the control example in accordance with Example 11, using a nozzle having a 610 μm opening diameter.

Testing the Sliding Capacity

As well as testing the thermal resistance and electrical properties, the sliding capacity was determined by two methods.

1. Measuring the Surface Resistance in Accordance with Parusel Coefficient of Friction When the surface resistance is measured in accordance with the Parusel coefficient of friction, an enamelled wire is passed between a polished steel surface and a steel slide lying thereon. The force which acts on the steel slide is measured. This results in a (dimensionless) coefficient of friction. Low values of the coefficient of friction mean low friction (tensiometry, see DIN EN 60851).

2. Measuring the Frictional Resistance in Accordance with Scintilla

An enamelled wire is passed at high speed under a steel block having a particular contact surface area. The force which is produced by the friction is measured. The result is in newtons (N).

Table 3 shows the measurement results for the enamelled wires and for the enamelled wire using the control example.

TABLE 3

Measurement results for frictional resistance

| Measurement method/ example | B6 | B7 | B8 | B9 | B10 | B11 |
|---|---|---|---|---|---|---|
| Number of Si units | appr. 63 | appr. 63 | appr. 63 | appr. 65 | appr. 132 | — |
| Parusel CoF (DIN EN 60851) | 0.120 | 0.130 | 0.210 | 0.132 | 0.099 | 0.230 |
| Scintilla [N] | 5.50 | 6.50 | 7.00 | 5.50 | 5.50 | 14.00 |

The measurement results shown in Table 3 demonstrate the advantage of the electrical insulation enamel according to the invention (B6-10) over an electrical insulation enamel without modifying units (B11). The higher the content of the modifying units in the polymer (cf. B6 20%, B7 10%, B8 5%), the lower the coefficient of friction and the frictional resistance are. A particularly low coefficient of friction is achieved by mixing two polymers, comprising modifying units which comprise a different number of Si units, in a mass ratio of 50:50 (see B 10).

Example 12

Production of a polyester-imide Modified with polydimethylsiloxane (PDMS)

A laboratory reactor (V4A, glass) having indirect heating (for example heat transfer oil) or controllable electrical resistance heating, product temperature monitoring, protective gas introduction, a continuously controllable maximally edge-to-edge agitator, a filling body column with head temperature measurement, bridge and descending reflux cooler (all distillate collected) is used as the reaction vessel. The column is moved as a dephlegmator.

The total amount of polyols (THEIC or glycerol, ethylene glycol), dimethyl terephthalate and 0.3% (based on the yield amount of the polyester-imide as a whole=nfA) butyltitanate are weighed in the stated sequence (see also recipe in Table 4). Subsequently, entrainer is added: Solvesso 150 as approximately 3% of total amount weighed in.

Starting to introduce the protective gas (most preferably nitrogen, but carbon dioxide or a mixture thereof with $N_2$ can also be used).

The reaction mixture is rapidly heated to approximately 160° C. Subsequently, the temperature is increased to max. 240° C. continuously over 5 hours. The time measurement is determined by the distillation process; the column head temperature should not exceed 75° C. (somewhat above the boiling point of methanol, 64.7° C.). The methanol which has distilled off is collected and the amount thereof is determined (density at 20° C.=0.7869). The reaction mixture is kept at 240° C., until no more methanol accumulates. Subsequently, the mixture is cooled to less than 140° C.

Subsequently, amine-functional polydimethylsiloxane is added. Trimellitic acid anhydride and 4,4'-diaminophenyl methane is added as a solid mixture, but at least in alternating portions. Subsequently, the mixture is heated again cautiously. The diimide carboxylic acid forms spontaneously and precipitates out. Enough Solvesso 150 is added to make the dispersion easy to stir.

Subsequently, the mixture is initially heated slowly to up to 240° C. The time measurement is determined by the distillation process; the column should not flood and the column head temperature should not exceed 105° C. (somewhat above the boiling point of water).

From 200° C. upwards, samples for measuring the acid number and viscosity are obtained. The acid number is determined by titration using 0.5 molar alcoholic KOH against phenolphthalein on a sample dissolved in preneutralised solvent [DIN 53169]. The dynamic viscosity is determined using a sample nfA 60% in solvent.

The reaction mixture is kept at 220° C. until the acid number is below 20 mg KOH/g.

Subsequently, the laboratory reactor is switched to the short path (descending distillation bridge, best for determining the distillation temperature) and the entrainer and residual water are distilled off. The mixture is kept at 220° C. until the intended characteristic values are reached.

Subsequently, the mixture is cooled to well below 170° C., and partially dissolved, by adding approximately 5-10% of the intended amount of solvent, before cooling again. At less than 130° C., the content of the laboratory reactor is discharged and further dissolved in the main amount of the solvent.

| Final characteristic values to be set: | nfA (60 min., 130° C.): | 70.0 ± 1.0% |
|---|---|---|
| | Acid No. (solid): | 5-15 mg KOH/g |
| | Viscosity (dyn.): | ±50 mPa · s (original partial dissolution, 23° C.) |

TABLE 4

Recipe:

| Components [g] | Weigh in [g] |
|---|---|
| Dimethylterephthalate | 64.02 |
| Trimellitic acid anhydride | 84.48 |
| N,N'-diaminodiphenylmethane | 43.56 |
| Trishydroxyethyl isocyanate | 96.18 |
| Glycerol | 0.00 |
| Ethylene glycol | 21.48 |

TABLE 4-continued

Recipe:

| Components [g] | Weigh in [g] |
|---|---|
| Modifier: amine-functional PDMS, for example: Aldrich: 480304 Poly[dimethylsiloxane-co-(3-aminopropyl)methylsiloxane] | 30.86 |
| Catalysts and solvents: | |
| Butyltitanate | 0.99 |
| Solvanol PCA (or cresols/phenols) or xylene | 9.90 |
| Solvesso 150 | 9.90 |
| Total, weighed in polymer blocks | 340.58 |
| Total methanol release | 7.69 |
| Total H₂O release | 2.33 |
| Modification content [%] | 10% |

Example 13

Production of a polyamide-imide Comprising a 5% Content of aminopropylmethylsiloxane dimethylsiloxane Copolymer Modifier
PDMS Modifier

| Code (ABCR) | Viscosity | Molecular weight [g/mol] | Mole % (aminopropyl) MeSiO |
|---|---|---|---|
| AMS-132 | 80-100 | 4500-5500 | 2.0-3.0 |
| AMS-152 | 120-180 | 7000-8000 | 4.0-5.0 |
| AMS-162 | 80-120 | 4000-5000 | 6.0-7.0 |

AMS-132: (2-3% aminopropylmethylsiloxane) dimethylsiloxane copolymer
AMS-152: (4-5% aminopropylmethylsiloxane) dimethylsiloxane copolymer
AMS-162: (6-7% aminopropylmethylsiloxane) dimethylsiloxane copolymer 100 g NMP, 50 g xylene and 45.6 g trimellitic acid anhydride (TMA) are weighed into a glass laboratory reactor having 0.5 l total volume, equipped with electrical resistance heating with temperature monitoring and control, with an agitator and a reflux cooler and the introduction of nitrogen. The TMA is dissolved at 70° C. while stirring. Subsequently, 4.6 g of the PDMS modifier, which comprises approximately 70-100 Si units, are metered in over a period of 15 min. The mixture is heated to 120° C., and subsequently kept at 120° C. for one hour so as to react the PDMS component to exhaustion. It is subsequently cooled to 40° C., and subsequently 58.7 g MDI are added over a period of one hour. The mixture is heated to 85° C. over a period of two hours, and subsequently to 130° C. until a viscosity of 5 Pa·s (measured in the plate/cone viscometer at 30° C.) is achieved. Subsequently, the mixture is cooled to 70° C., and by adding 1.2 g ethanol, the remaining free isocyanate functions are reacted. The resulting product has a solids content of 47-51% (measured at 1 hour, 130° C. in the circulating furnace): AMS-123: 51% solids; AMS-152: 47% solids; AMS-162: 48% solids.
Application and Firing Conditions The PAI which had been functionalised with AMS-132 was set to a solids content of 40% by adding NMP, and 200 μm thereof were applied and fired for 10 min at 220° C.

The coated sheet metal was tested on the IFAM.

Example 14

Production of the Aqueous Polyurethane Dispersions Comprising a 5% Content of (2-3% aminopropylmethylsiloxane) dimethylsiloxane Copolymer as a Modifier
14.1

36.15 g MDI are dissolved in 74 g butanone at 82° C. in a reaction apparatus as described in Example 13. Subsequently, 41.27 g Priplast 1838, 1.43 g neopentylglycol (NPG), 6.46 g dimethanolpropionic acid (DMPA) and 7.93 g cyclohexyldimethanol (CHDM) are added in succession, and this reaction mixture is brought to reaction at 82° C. for 3 hours. After cooling to room temperature, 4.66 g of the modifier AMS-132 is added in drops over 15 min. After a further 15 min of stirring at 50° C., 1.77 g butanol are added and the mixture is kept at 82° C. for 30 min. After adding 2.14 g dimethylethylethanolamine (DMEA) over a period of 5 min, the mixture is stirred for a further 30 min at 82° C. After cooling to 65° C., 9.64 g butylglycol are added and the mixture is stirred for 30 min. Subsequently, 138.6 g water are added. Subsequently, the butanone is distilled off from the resulting dispersion on the rotary evaporator.

The resulting product is set to a solids content of 40% (measured at 1 hour, 130° C. in the circulating furnace) by adding water.

The polyurethane dispersion is set to a solids content of 25%, a 200 μm wet film thickness is applied using a doctor blade, and it is fired at 100° C. for 10 min.

| Polyurethane 6 (solids = 40%) | | |
|---|---|---|
| Chemicals | n | M [g/mol] |
| Butanone | | 72.11 |
| MDI | 1.05 | 250.25 |
| Priplast 1838 | 0.15 | |
| NPG | 0.1 | 104.16 |
| DMPA | 0.35 | 134.16 |
| CHDM | 0.4 | 144.2 |
| Modifier | | 5000 |
| Butanol | 0.174 | 74.12 |
| DMEA | 0.175 | 89.14 |
| Butylglycol | 0.593 | 118.18 |
| Bidest | | |

14.2

52.55 g MDI are dissolved in 85.9 g butanone at 82° C. in a reaction apparatus as described in Example 13. Subsequently, 40 g Priplast 1838, 2.08 g neopentylglycol (NPG), 9.38 g dimethanolpropionic acid (DMPA) and 12.96 g cyclohexyldimethanol (CHDM) are added in succession, and this reaction mixture is brought to reaction at 82° C. for 3 hours. After cooling to room temperature, 6.13 g of the modifier AMS-132 is added in drops over 15 min. After a further 15 min of stirring at 50° C., 2.58 g butanol are added and the mixture is kept at 82° C. for 30 min. After adding 3.12 g dimethylethylethanolamine (DMEA) over a period of 5 min, the mixture is stirred for a further 30 min at 82° C. After cooling to 65° C., 14 g butylglycol are added and the mixture is stirred for 30 min. Subsequently, 176.6 g water are added. Subsequently, the butanone is distilled off from the resulting dispersion on the rotary evaporator.

The resulting product is set to a solids content of 40% (measured at 1 hour, 130° C. in the circulating furnace) by adding water.

The polyurethane dispersion is set to a solids content of 30%, a 200 μm wet film thickness is applied using a doctor blade, and it is fired at 100° C. for 10 min.

| Polyurethane 9 (solids = 40%) | | |
| --- | --- | --- |
| Chemicals | n | M [g/mol] |
| Butanone |  | 72.11 |
| MDI | 1.05 | 250.25 |
| Priplast 1838 | 0.1 |  |
| NPG | 0.1 | 104.16 |
| DMPA | 0.35 | 134.16 |
| CHDM | 0.45 | 144.2 |
| Modifier |  | 5000 |
| Butanol | 0.174 | 74.12 |
| DMEA | 0.175 | 89.14 |
| Butylglycol Bidest | 0.593 | 118.18 |

14.3

52.55 g MDI are dissolved in 90 g butanone at 82° C. in a reaction apparatus as described in Example 1. Subsequently, 30 g Priplast 1838, 2.08 g neopentylglycol (NPG), 9.38 g dimethanolpropionic acid (DMPA) and 13.68 g cyclohexyldimethanol (CHDM) are added in succession, and this reaction mixture is brought to reaction at 82° C. for 3 hours. After cooling to room temperature, 5.66 g of the modifier AMS-132 is added in drops over 15 min. After a further 15 min of stirring at 50° C., 2.58 g butanol are added and the mixture is kept at 82° C. for 30 min. After adding 3.12 g dimethylethylethanolamine (DMEA) over a period of 5 min, the mixture is stirred for a further 30 min at 82° C. After cooling to 65° C., 14 g butylglycol are added and the mixture is stirred for 30 min. Subsequently, 164.4 g water are added. Subsequently, the butanone is distilled off from the resulting dispersion on the rotary evaporator.

The resulting product is set to a solids content of 40% (measured at 1 hour, 130° C. in the circulating furnace) by adding water.

The polyurethane dispersion is set to a solids content of 30%, a 200 μm wet film thickness is applied using a doctor blade, and it is fired at 100° C. for 10 min.

| Polyurethane 10 (solids = 40%) | | |
| --- | --- | --- |
| Chemicals | n | M [g/mol] |
| Butanone |  | 72.11 |
| MDI | 1.05 | 250.25 |
| Priplast 1838 | 0.075 |  |
| NPG | 0.1 | 104.16 |
| DMPA | 0.35 | 134.16 |
| CHDM | 0.475 | 144.2 |
| Modifier |  | 5000 |
| Butanol | 0.174 | 74.12 |
| DMEA | 0.175 | 89.14 |
| Butylglycol Bidest | 0.593 | 118.18 |

Example 15

Synthesis Procedure for In Situ Synthesis of a PDMS Gel Particle Dispersion

The disperse phase (NMP position 1) and a suitable emulsifying agent (position 2) are placed in advance in a 2 liter glass reactor having a maximally wall-to-wall anchor agitator and a reflux cooler.

The vinyl-functional PDMS prepolymer (position 3) is mixed with a suitable catalyst (position 4) filled into a dropping funnel.

The hydride-functionalised PDMS prepolymer (position 5) is filled into a further dropping funnel.

The two prepolymers are added in drops over a period of approximately 10 min with intensive stirring.

(By way of the catalyst selection, the necessary reaction temperature can be varied from room temperature to over 100° C.)

The mixture is stirred intensively for a further 5 hours and subsequently stirred slowly for 20 hours.

Example recipe GP2002:

| Pos. | Raw material | Chem. name | Molar mass | Functionality | Equivalent [%] | Masses [%] |
| --- | --- | --- | --- | --- | --- | --- |
| 1 | Disperse phase | N-methyl-pyrrolidone |  |  |  | 79.496 |
| 2 | Emulsifying agent D.C. Fluid 190 | Silicon glycol copolymer |  |  |  | 0.3 |
| 3 | ABCR: DMS V05 | Divinyl-terminated poly-dimethyl-siloxane (prepolymer) | 800 | 2 | 47.3 | 5.6 |
| 4 | ABCR: SIP 6830.3 | Pt Catalyst (active at room temp.) |  |  |  | 0.204 |
| 5 | ABC: HMS-082 | Methyl-hydro-siloxane dimethyl-siloxane copolymer (prepolymer) | 6000 | 6.49 | 52.7 | 14.4 |
|  |  |  |  | TOTAL: | 100.00 | 100.00 |

The dispersion obtained of crosslinked PDMS gel particles is worked into conventional NMP-based polyamide-imide electrical insulation enamel (for example using Dispermats or Ultra-Turraxes).

Content of the dispersion in the "blend":

1-75 (PDMS gel particle dispersion); preferably 5-20%; particularly preferably approx. 10%

Advantages of this synthesis and of the PDMS gel particles obtained:

The mesh width of the crosslinked gel particles can be controlled by way of the functionality and molar mass of the prepolymers.

As a result of using monovinyl-functional prepolymers, "dangling ends" (free polymer ends) can be introduced, and gel particles having a PDMS brush surface can be produced.

As a result of using an excess of divinyl-functional prepolymers, "dangling ends" (free polymer ends) can similarly be introduced, and gel particles having a PDMS brush surface can be produced.

As a result of the crosslinking within the gel particles, the migration capacity of the siloxanes is suppressed.

As a result of the in situ synthesis in NMP, the dispersion obtained can be worked directly into an NMP-based electrical insulation enamel.

The dispersion obtained of crosslinked PDMS gel particles can be worked into an NMP-based electrical insulation enamel as an additive; as a result of "missing" polyether segments, the thermal stability is increased by comparison with conventional lubricant additives (polyether polydimethylsiloxane copolymers)

Example 16

Application Tests Using PDMS Gel Particle Dispersions

Table 5 shows mixtures of electrical insulation enamels and PDMS gel particles for which application tests are carried out with subsequent friction tests.

The PDMS gel particle dispersions were worked into a conventional NMP-based polyamide-imide electrical insulation enamel and into a modified enamel consisting of polyamide-imide polydimethylsiloxane block copolymers having a 20% PDMS content.

TABLE 5

| Content of PDMS gel particle dispersion GP 2001 | Content of PDMS gel particle dispersion GP 2002 | Content of PDMS gel particle dispersion GP 2007 | Content of non-modified poly-amide-imide enamel 595/30 | Content of modified poly-amide-imide enamel PAI LM 28C30C (20% PDMS content) | Friction test, Parusel CoF (DIN EN 60851) | Friction test, Scintilla [N] |
|---|---|---|---|---|---|---|
| — | 10% | — | 90% | — | 0.115 | 5.5 |
| — | 40% | — | 60% | — | 0.180 | 7.75 |
| — | 75% | — | 25% | — | 0.195 | 8.0 |
| 40% | — | — | 60% | — | 0.174 | 8.5 |
| 100% | — | — | — | — | 0.241 | 7.25 |
| — | 10% | — | — | 90% | 0.127 | 5.5 |
| — | 40% | — | — | 60% | 0.139 | 7.5 |
| — | 75% | — | — | 25% | 0.141 | 7.0 |
| Control: pure PAI | | | 100% | | 0.230 | 14.0 |

Sliding Capacity Test

As well as testing the thermal resistance and electrical properties, the sliding capacity was determined by two methods.

1. Measuring the Surface Resistance in Accordance with Parusel Coefficient of Friction When the surface resistance is measured in accordance with the Parusel coefficient of friction, an enamelled wire is passed between a polished steel surface and a steel slide lying thereon. The force which acts on the steel slide is measured. This results in a (dimensionless) coefficient of friction. Low values of the coefficient of friction mean low friction (tensiometry, see DIN EN 60851).

2. Measuring the Frictional Resistance in Accordance with Scintilla

An enamelled wire is passed at high speed under a steel block having a particular contact surface area. The force which is produced by the friction is measured. The result is in newtons (N).

The invention claimed is:

1. An electrical insulation enamel comprising a base polymer and modifying units which are incompatible with the base polymer after the polymer has cured, wherein the base polymer is polyamide-imide and the modifying units are polydialkylsiloxanes which comprise 40 to 500 Si units, further comprising combinations of the base polymer with a plurality of different modifying units having a different number of Si units and wherein the cured enamel has a phase separation on the surface with separate regions formed from the base polymer and other separate regions formed from the modifying units.

2. The electrical insulation enamel of claim 1, wherein the modifying units are polydimethylsiloxanes.

3. A cured electrical insulation enamel which can be obtained by thermally curing the electrical insulation enamel of claim 1, comprising separate regions on the surface of the cured electrical insulation enamel.

4. A process for producing the electrical insulation enamel of claim 1, comprising:
polymerizing a first modified block, for example a monomer or a prepolymer, which comprises at least one modifying unit, with at least one second monomer, so as to obtain a polymer comprising modifying units; and,
formulating the polymer comprising modifying units with a solvent and optionally additives so as to form an electrical insulation enamel.

5. A process for producing a coated wire, comprising:
polymerizing a first modified block, for example a monomer or a prepolymer, with at least one modifying unit comprising at least a second monomer, so as to obtain a polymer comprising modifying units;
formulating the polymer comprising modifying units with a solvent and optionally additives so as to form an electrical insulation enamel of claim 1;
applying the electrical insulation enamel to a wire; and,
subjecting the wire with the applied electrical insulation enamel to a firing process, there being separate regions on the surface of the cured electrical insulation enamel.

6. A wire coated with the electrical insulation enamel of claim 1.

7. A wire comprising electrical insulation enamel without modifying units wherein the electrical insulation enamel of claim 1 is applied, as an outer layer or layers, to the wire.

8. A wire coated with the electrical insulation enamel of claim 3.

9. A wire comprising an electrical insulation enamel without modifying units and an outer layer or layers of the electrical insulating enamel of claim 3.

10. A coil comprising the wire of claim 8.

11. An electrical insulation enamel, comprising a base polymer and polydialkylsiloxane gel particles, wherein the base polymer is polyamide-imide and the polydialkylsiloxane gel particles comprise a plurality of polydialkylsiloxanes comprising a different number of Si units and comprising 40 to 500 Si units, further comprising combinations of the base polymer with the plurality of different polydialkylsiloxanes and wherein the enamel has a phase separation on the surface with separate regions formed from the base polymer and other separate regions formed from the plurality of different polydialkylsiloxanes.

12. The electrical insulation enamel of claim 11, wherein the polydialkylsiloxane gel particles are polydimethylsiloxane gel particles.

13. A cured electrical insulation enamel which can be obtained by thermally curing the electrical insulation enamel of claim 11.

14. A process for producing the electrical insulation enamel of claim 11, comprising mixing a polysiloxane gel particle dispersion and an enamel which contains a polymer.

15. The process of claim 14, wherein the enamel which contains the polymer is a conventional enamel or an electrical insulation enamel comprising a base polymer and modifying units which are incompatible with the base polymer after the polymer has cured, wherein the base polymer is polyamide-imide and the modifying units are polydialkylsiloxanes which comprise 40 to 500 Si units, further comprising combinations of the base polymer with a plurality of different modifying units having a different number of Si units and wherein the cured enamel has a phase separation on the surface with separate regions formed from the base polymer and other separate regions formed from the modifying units.

16. A wire comprising the electrical insulation enamel of claim 11.

17. A wire coated with the electrical insulation enamel of claim 13.

18. A wire which comprises an electrical insulation enamel without modifying units and an outer layer or layers comprising the electrical insulation enamel of claim 13.

19. A coil comprising the wire of claim 17.

20. The wire of claim 9, wherein the wire is a copper wire.

21. The wire of claim 10, wherein the wire is a copper wire.

22. The wire of claim 16, wherein the wire is a copper wire.

23. The wire of claim 17, wherein the wire is a copper wire.

24. The wire of claim 18, wherein the wire is a copper wire.

25. A coil comprising the wire of claim 23.

* * * * *